US012497268B2

(12) United States Patent
Swee Keat et al.

(10) Patent No.: US 12,497,268 B2
(45) Date of Patent: Dec. 16, 2025

(54) INTERCONNECTION UNIT CONFIGURED TO CONNECT MODULES OF A CARGO CONTAINER COUPLING ARRANGEMENT

(71) Applicant: CARGOTEC SWEDEN AB, Kista (SE)

(72) Inventors: Liang Swee Keat, Perak (MY); Johan Olof Bergman, Saltsjöbaden (SE)

(73) Assignee: CARGOTEC SWEDEN AB, Kista (SE)

( * ) Notice: Subject to any disclaimer, the term of this patent is extended or adjusted under 35 U.S.C. 154(b) by 902 days.

(21) Appl. No.: 17/773,258

(22) PCT Filed: Oct. 20, 2020

(86) PCT No.: PCT/SE2020/051005
§ 371 (c)(1),
(2) Date: Apr. 29, 2022

(87) PCT Pub. No.: WO2021/086248
PCT Pub. Date: May 6, 2021

(65) Prior Publication Data

US 2024/0174491 A1 May 30, 2024

(30) Foreign Application Priority Data

Oct. 31, 2019 (SE) .................................... 1951248-2

(51) Int. Cl.
*B66C 1/00* (2006.01)
*B66C 1/10* (2006.01)
(Continued)

(52) U.S. Cl.
CPC ............ *B66C 1/101* (2013.01); *B66C 13/085* (2013.01); *B66C 13/48* (2013.01)

(58) Field of Classification Search
CPC ....... B66C 1/101; B66C 13/085; B66C 13/48; B66C 1/66; B66C 1/663; B66C 13/06;
(Continued)

(56) References Cited

U.S. PATENT DOCUMENTS 7,559,429 B1 * 7/2009 Ichimura ............... B66C 19/002 212/323
2008/0011742 A1 * 1/2008 Bellehumeur .......... B66C 1/663 220/1.5
2014/0034597 A1 * 2/2014 Steinhaus ............... B66C 13/18 212/71

FOREIGN PATENT DOCUMENTS

CN 101891109 A 11/2010
JP 61206581 A 12/1986
(Continued)

OTHER PUBLICATIONS

International Search Report for related Application No. PCT/SE2020/051005 mailed Feb. 2, 2021.
(Continued)

*Primary Examiner* — Jacob A Smith
(74) *Attorney, Agent, or Firm* — Renner, Otto, Boisselle & Sklar, LLP

(57) ABSTRACT

The invention relates to an interconnection unit (124) connecting modules of a container coupling arrangement (120), which are configured to be releasebly attached to a lifting arrangement (110) and to couple a container (130) with the lifting arrangement, wherein the modules comprise at least a head block module (122) and a spreader module (123), the interconnection unit comprising one or more head block fastening units (1241, 1242), which are provided with an anchor point (1243, 1244), wherein the anchor point is configured to releasebly attach to the head block module of the lifting arrangement, each head block fastening unit movably coupled to a corresponding displacement unit
(Continued)

(1245, 1246), the interconnection unit (124) further comprising the one or more corresponding displacement units, being movably coupled to the corresponding head block fastening unit and movably coupled to a spreader fastening unit (1247), the interconnection unit further comprising a plurality of locking arrangements.

14 Claims, 10 Drawing Sheets

(51) Int. Cl.
*B66C 13/08* (2006.01)
*B66C 13/48* (2006.01)

(58) Field of Classification Search
CPC ......... B66C 15/00; B66C 1/00; E04B 1/3483; E04B 1/1903; E04B 1/24; E04B 1/34384
USPC ..... 294/81.4; 52/79.1, 745.02, 79.9; 410/24, 410/14, 18
See application file for complete search history.

(56) References Cited

FOREIGN PATENT DOCUMENTS

| | | | |
|---|---|---|---|
| KR | 950031875 | A | 12/1995 |
| KR | 20130072571 | A | 7/2013 |
| WO | 2018185172 | A1 | 10/2018 |

OTHER PUBLICATIONS

Written Opinion for related Application No. PCT/SE2020/051005 mailed Feb. 2, 2021.
Second Written Opinion for related Application No. PCT/SE2020/051005 mailed Apr. 16, 2021.
International Preliminary Report on Patentability and Annex for related Application No. PCT/SE2020/051005 dated Nov. 24, 2021.

* cited by examiner

INTERCONNECTION UNIT CONFIGURED TO CONNECT MODULES OF A CARGO CONTAINER COUPLING ARRANGEMENT

This application is a national phase of International Application No. PCT/SE2020/051005 filed Oct. 20, 2020, which claims priority to Swedish Application No. 1951248-2 filed Oct. 31, 2019, the entire disclosures of which are hereby incorporated by reference.

TECHNICAL FIELD

The present disclosure generally relates to an interconnection unit configured to connect modules of a cargo container coupling arrangement. The disclosure further relates to a system and a control unit.

BACKGROUND

When handling cargo containers, typically when loading or unloading a container ship at a seaport, the containers are typically moved using a cargo container coupling arrangement. The coupling arrangement is typically configured to be releasebly attached to a lifting arrangement. Lifting arrangements may e.g. be cranes lifting containers on/off a ship, cranes handling the containers in a yard or other mobile units or vehicles, such as straddle carriers, reach stackers, Rubber Tired Gantry Cranes (RTG) or Rail Mounted Gantry Cranes (RMG), which are lifting and/or moving containers within a cargo area, yard or seaport.

The coupling arrangement typically comprises modules, such as a head block module and a spreader module. The lifting arrangements use coupling arrangements to grip and secure a cargo container when lifting and moving the cargo container. In the coupling arrangement, the spreader module is typically capable to adjust itself to the length of a cargo container to be lifted or moved. This is usually performed by telescoping beams provided with gripping arrangements or anchor points, such as twist-locks.

The head block module could be seen as the “interface” of the lifting arrangement, e.g. a cable crane, to which the spreader module needs to connect to, to be able to move cargo containers. The connection is typically made by matching and connecting anchor points of the spreader module to correspondingly positioned anchor points of the head block module.

Conventional solutions for matching the spreader module to the head block module includes designing a new model of the spreader module, where anchor points of the spreader module have a matched position relatively to the anchor points of the head block module and welded into place.

A drawback with such conventional solutions is that flexibility when replacing or swapping out spreader models are reduced. A further drawback is that engineering design resources are increased due to the high need of customization in spreader module design to adapt to different head-block configurations.

A further drawback with such conventional solutions is that the production and warehouse costs are increased, as a large number of variations or modules of spreader modules must be produced or held in stock.

It would be desirable to provide new ways to address one or more of the above mentioned issues or drawbacks.

OBJECTS OF THE INVENTION

An objective of embodiments of the present invention is to provide a solution which mitigates or solves the drawbacks described above.

SUMMARY OF THE INVENTION

The above objective is achieved by the subject matter described herein. Further advantageous implementation forms of the invention are described herein.

According to a first aspect of the invention the objects of the invention is achieved by an interconnection unit configured to connect modules of a cargo container coupling arrangement, the coupling arrangement being configured to be releasebly attached to a lifting arrangement and configured to couple a cargo container with the lifting arrangement, wherein the modules comprise at least a head block module and a spreader module, the interconnection unit comprising one or more head block fastening units, each head block fastening unit being provided with an anchor point arranged in a first plane, wherein a first reference axis and a second reference axis are mutually orthogonal to one another and extending along the first plane, wherein the anchor point is configured to releasebly attach to the head block module of the lifting arrangement using an anchor point matching the head block module, each head block fastening unit movably coupled to a corresponding displacement unit and arranged to displace the provided anchor point along an axis parallel to the first reference axis X, the interconnection unit further comprising the one or more corresponding displacement units, each displacement unit being movably coupled to the corresponding head block fastening unit and movably coupled to a spreader fastening unit, the displacement unit being arranged to displace the provided anchor point of the corresponding head block fastening unit along a axis parallel to the second reference axis Y, the interconnection unit further comprising the spreader fastening unit configured to be attached to the spreader module, wherein the spreader fastening unit is movably coupled to the one or more displacement units, and the interconnection unit further comprising a plurality of locking arrangements, each locking arrangement being configured to prevent each displacement unit from moving relatively to the spreader fastening unit, or to prevent each head block fastening unit from moving relatively to the corresponding displacement unit.

An advantage of the first aspect is that flexibility when replacing or swapping out spreader models attached to head blocks is increased. I.e. the same spreader module can be adapted to several head blocks. A further advantage is that engineering design resources can be reduced. A further advantage is that the production and warehouse costs can be reduced, as a smaller number of variations of spreader modules must be produced or held in stock compared to when conventional solutions are applied.

It is noted that embodiments of the present disclosure relate to all possible combinations of features recited in the claims. The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1A:
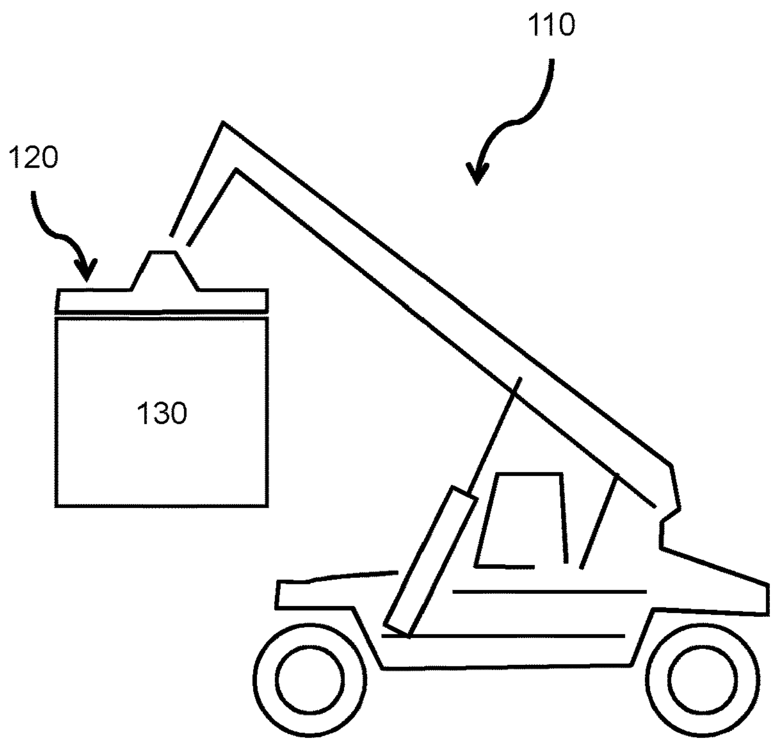
FIG. 1A-B shows cargo container coupling arrangements according to one or more embodiments of the invention.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

In the present disclosure, the term "control unit" denotes a unit comprising processing circuitry and a memory. The memory contains instructions executable by the processing circuitry to perform any of the methods and/or method steps described herein. The control unit is further detailed in relation to FIG. 8.

In the present disclosure, the term "coupling arrangement" denotes an arrangement configured to couple a lifting arrangement, such as a wire cable crane, to cargo, in particular cargo containers. Typically, such an arrangement includes a spreader provided with adjustable telescopic arms and twist-locks for gripping the corners of a container. The coupling arrangement is configured to be releasebly attached to a lifting arrangement, in the sense that it may be separated from the lifting arrangement and re-attached again at a later stage. The coupling arrangement typically couples the cargo container with the lifting arrangement by acting as an adapter, e.g. an adapter from wire ropes of a crane to locking/securing arrangements in the corner of a cargo container. Thereby the cargo/container is secured to the lifting arrangement during a lifting operation.

FIG. 1A shows a cargo container coupling arrangement 120 according to one or more embodiments of the invention. The coupling arrangement 120 is releasebly attached to a lifting arrangement 110 and configured to couple a cargo container 130 with the lifting arrangement 110. In the embodiment shown in FIG. 1A, the lifting arrangement is a reach stacker having a coupling arrangement configured to be releasebly attached to a lifting arrangement. This allows the coupling arrangement to be replaced in a simple manner.

Figure 1B:
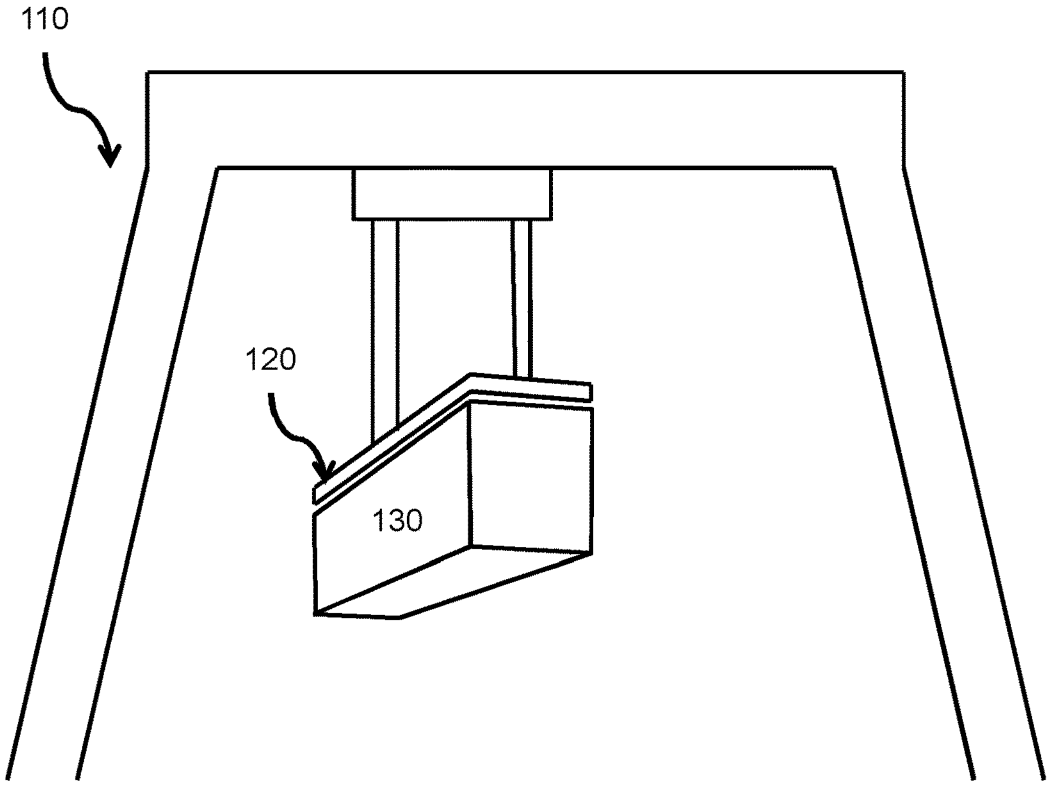

FIG. 1B also shows a cargo container coupling arrangement 120 according to one or more embodiments of the invention. The coupling arrangement 120 is releasebly attached to a lifting arrangement 110 and configured to couple a cargo container 130 with the lifting arrangement 110. In the embodiment shown in FIG. 1B, the lifting arrangement is a wire rope crane having a coupling arrangement configured to be releasebly attached to a lifting arrangement. This allows the coupling arrangement to be replaced in a simple manner.

It is understood that the present disclosure does not limit the teaching to the lifting arrangements presented above, but could also include other lifting arrangements suitable for lifting containers, such as a straddle carrier.

Figure 2:
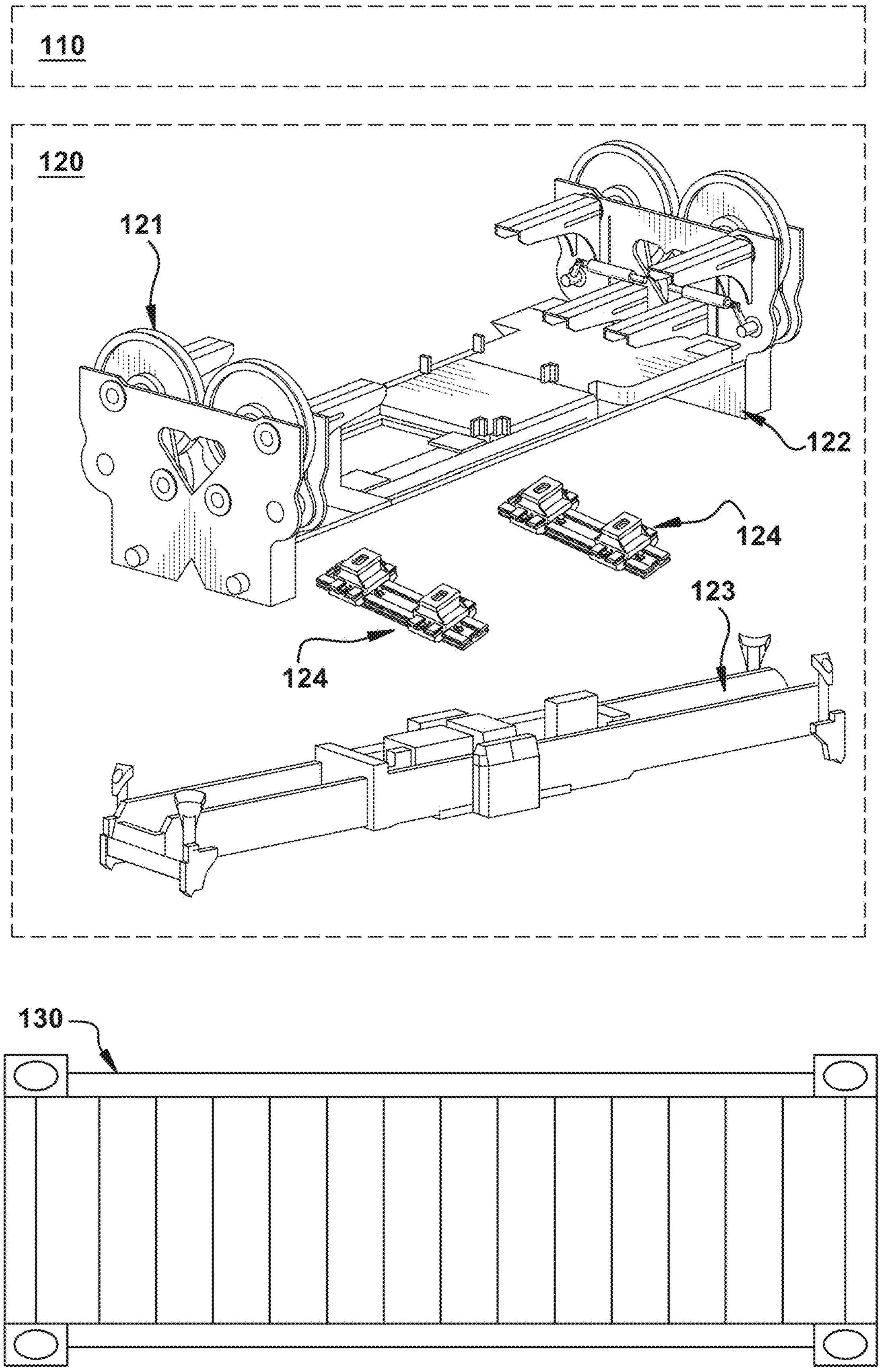
FIG. 2 shows details of a cargo container coupling arrangement according to one or more embodiments of the invention.

FIG. 2 shows details of the cargo container coupling arrangement 120 according to one or more embodiments of the invention. In particular, FIG. 2 shows details of the coupling arrangement described in relation to FIG. 1B. The coupling arrangement may comprise a selection of modules selected from any of a wire rope sheave module 121, a head block module 122 and a spreader module 123. The coupling arrangement, in some embodiments, always comprises the head block module 122 and the spreader module 123 connected using one or more interconnection units 124.

In a first example, the coupling arrangement comprise three modules, a wire rope sheave module 121, a head block module 122 and a spreader module 123. The sheave comprises a wire rope sheave module 121, through which the wire ropes of the crane 110 runs. The rope sheave module 121 is releasebly attached to the head block module 122. The one or more interconnection units 124 are typically attached to the spreader 122 module, e.g. using bolts or welds. The anchor points of the interconnection units 124 can be adjusted or moved to match positions of anchor points of the head block module 122. Optionally, the anchor points of the interconnection units 124 can further be locked into position by the use of one or more locking arrangements. The anchor points of the interconnection units 124 can then releasebly attach to the head block (122) module of the lifting arrangement (110) using the matching anchor points of the head block (122) module, e.g. by the use of a twist-lock pin connection or a pin trough connection. The spreader module 123 can optionally move relatively to the head block module 122, e.g. to balance an unevenly loaded container. The rope sheave module 121 is typically connected/coupled with the crane 110 by steel cables. The spreader is typically telescopic and can be adjusted to handle containers in different sizes. The spreader is equipped with a twist lock matching each position of anchor points/fastening arrangements/corner castings in each corner of the cargo container and, when inserted in the corner casting of the container it locks to the container. Thus, it ensures that a lift of the container is possible to perform in a secure manner. In every corner of the spreader, above the twist locks, there are typically metal legs, paddles or side flippers called seekers attached. They can be tilted downwards and be used to guide the spreader 123 to the corners of the container 130 that should be attached to the spreader 123. Optionally the spreader 123 is configured to lift two containers simultaneously, this may be referred to as a twin spreader.

In a second example, the coupling arrangement comprise an integrated unit comprising the functionality of the three modules, the wire rope sheave module 121, the head block module 122 and the spreader module 123.

In a third example, the coupling arrangement is releaseably attached to a vehicle, such as a reach stacker and comprises only the functionality of the spreader module 123.

Sometimes the sheave module 121 is mounted straight to the spreader module 123 without using a head block. In those cases, you remove the sheaves, or the axis of the sheaves when removing the spreader from the crane.

Any other combination of the wire rope sheave module 121, the head block module 122 and the spreader module 123 could be envisage, depending on the application and without departing from the present disclosure.

The present disclosure relates to an interconnection unit that aims to allow improved compatibility and/or adaptability of the spreader module 123, in order to facilitate improved flexibility when connecting to a lifting arrangement, e.g. using a head block module.

In other words, the present disclosure has at least the advantage that a single model of a spreader module 123 can be easily and flexibly adapted to fit to a plurality of lifting arrangements, e.g. to different cranes using different head block modules.

In a general embodiment of the disclosure, the interconnection unit 124 is configured to connect modules of a cargo container coupling arrangement 120. The coupling arrangement 120 is configured to be releaseably attached to a lifting arrangement 110 and is configured to couple a cargo container 130 with the lifting arrangement (110). This could typically be a system setup used in a sea harbor. The modules typically comprise a selection of a head block module 122 and a spreader module 123.

The provided interconnection unit 124 comprises one or more head block fastening units 1241, 1242, each head block fastening unit being provided with an anchor point 1243, 1244 arranged in a first plane, each head block fastening unit 1241, 1242 movably coupled to a corresponding displacement unit 1245, 1246 and arranged to displace the provided anchor point 1243, 1244 along an axis parallel to a first reference axis X. In other words, the head block fastening units 1241, 1242 provides adaptability of the anchor point along a first direction or axis.

In a preferred embodiment, the cargo container coupling arrangement 120 comprises two interconnection units 124, which each comprises one or more head block fastening units 1241, 1242. Each head block fastening unit being provided with an anchor point 1243, 1244 arranged in a first plane, each head block fastening unit 1241, 1242 movably coupled to a corresponding displacement unit 1245, 1246 and arranged to displace the provided anchor point 1243, 1244 along an axis parallel to a first reference axis X.

The interconnection unit 124 further comprises the one or more corresponding displacement units 1245, 1246, each displacement unit (1245, 1246) being movably coupled to the corresponding head block fastening unit 1241, 1242 and movably coupled to a spreader fastening unit 1247, the displacement unit 1245, 1246 being arranged to displace the provided anchor point 1243, 1244 of the corresponding head block fastening unit 1241, 1242 along a axis parallel to a second reference axis Y. In other words, the displacement units 1245, 1246 provides adaptability of the anchor point along a second direction or axis.

The interconnection unit (124) further comprises a spreader fastening unit 1247 configured to be attached to the spreader module 123, e.g. by welding a boxway to the spreader module 123. The spreader fastening unit 1247 is movably coupled to the one or more displacement units 1245, 1246.

In a further example, spreader fastening unit 1247 in the form of a boxway is provided and may be bolted to the spreader module 123.

The interconnection unit 124 further comprises a plurality of locking arrangements, each locking arrangement being configured to prevent each displacement unit 1245, 1246 from moving relatively to the spreader fastening unit 1247, and/or to prevent each head block fastening unit 1241, 1242 from moving relatively to the corresponding displacement unit 1245, 1246.

In a typical application, the spreader fastening unit 1247 may be comprised in the spreader module 123 by attaching the spreader fastening unit 1247 to the spreader module 123 using welding or bolt connection techniques.

The first reference axis X and a second reference axis Y described above, are mutually orthogonal to one another and extending along the first plane. Each of the anchor points 1243, 1244 is typically configured to releasebly attach to the head block module 122 of the lifting arrangement 110 using an anchor point matching the head block module 122.

In other words, each of the anchor points 1243, 1244 is moved to a position matching a position in the first plane of a corresponding anchor points of the lifting arrangement 110, e.g. positions of anchor points of a head block module. This enables the spreader module 123 to connect to multiple different head block modules 122 having different positions of its anchor points. Thus, the interconnection unit allows the spreader module 123 to be adapted/adjusted to a particular head block module 122.

Figure 3:
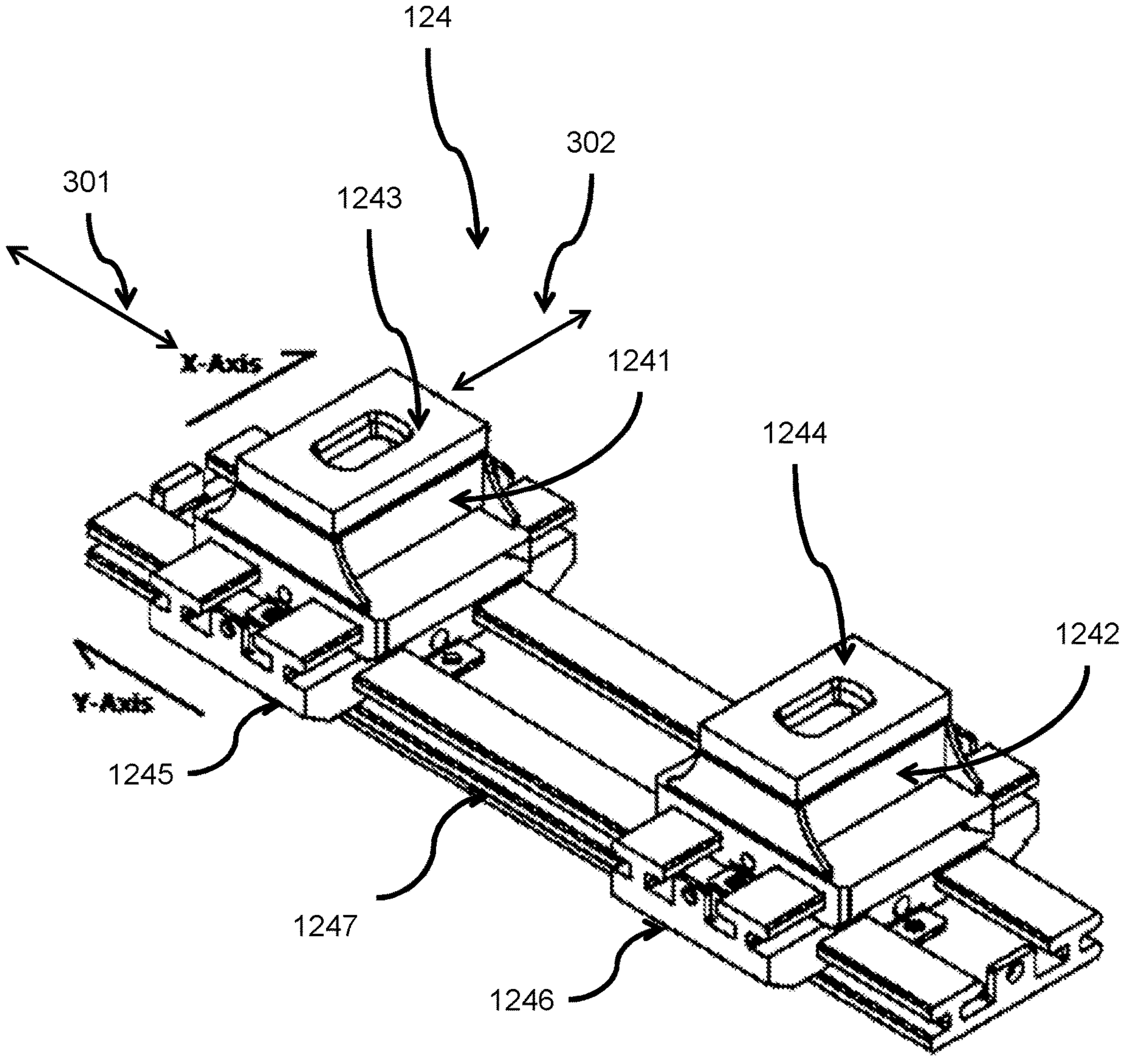
FIG. 3 shows an interconnection unit according to one or more embodiments of the present disclosure.

FIG. 3 shows an interconnection unit according to one or more embodiments of the present disclosure. The Interconnection unit 124 is configured to connect modules of a cargo container coupling arrangement 120. The coupling arrangement 120 is configured to be releaseably attached to the lifting arrangement 110 and configured to couple the cargo container 130 with the lifting arrangement 110. The modules typically comprise at least a head block 122 module and a spreader 123 module. Coupling of the cargo container is further described in relation to FIG. 1 and FIG. 2.

In one embodiment, the interconnection unit 124 comprises one or more head block fastening units or X-axis saddle members 1241, 1242. Each head block fastening unit 1241, 1242 is provided with an anchor point 1243, 1244 arranged in a first plane. The anchor point 1243, 1244 is typically attached to the head block fastening unit 1241, 1242, e.g. using bolts or a weld. A coordinate system comprising a first reference axis X and a second reference axis Y which are mutually orthogonal and extending along the first plane may be defined.

Each of the anchor points 1243, 1244 is configured to releasebly attach to the head block 122 module of the lifting arrangement 110 using a matching anchor point of the head block 122 module. The anchor point may e.g. be one part of a twist-lock pin connection, a one part of a pin through connection or a sheave wheel connection, as further illustrated in relation to FIG. 4A-C.

Figure 4A:
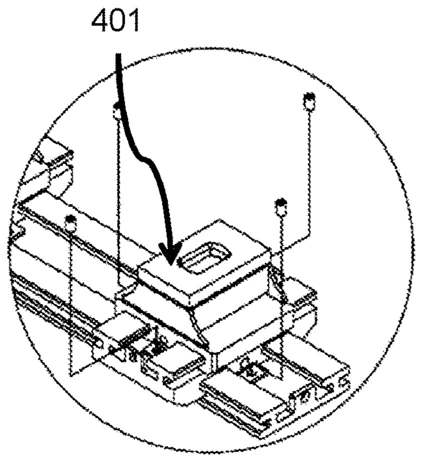
FIG. 4A-C shows anchor points according to one or more embodiments of the present disclosure.
Figure 4B:
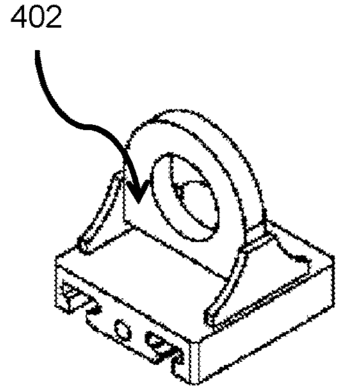
Figure 4C:
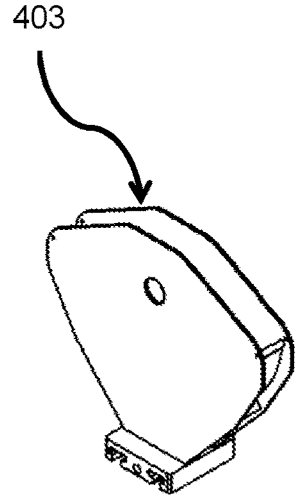

FIG. 4A-C shows anchor points according to one or more embodiments of the present disclosure. In one or more embodiments, each anchor point 1243, 1244 comprises a twist-lock pin connection 401, a pin through connection 402 or a sheave modules connection 403. Any standardized or propriety anchor point suitable for the application may be used.

Further describing FIG. 3, each head block fastening unit 1241, 1242 is movably coupled to a corresponding displacement unit 1245, 1246, and arranged to displace the provided anchor point 1243, 1244 along a first axis 302 parallel to the first reference axis X.

In one example, a first head block fastening unit 1241 is provided with an anchor point 1243, welded onto the first head block fastening unit. The first head block fastening unit 1241 has a corresponding first displacement unit 1245. The first head block fastening unit 1241 can slide along a first axis 302 parallel to the first reference axis X, and thereby displace the provided anchor point 1243.

In other words, the position of the anchor point 1243 can be adjusted in the first plane.

Each head block fastening unit 1241, 1242 may e.g. be movably coupled to the corresponding displacement unit 1245, 1246 using a plain linear bearing or slide, such as boxway or dovetail plain linear bearings. The head block fastening unit 1241, 1242 is provided with one part of the plain linear bearing and the corresponding displacement unit 1245, 1246 is provided with a corresponding second part of the plain linear bearing. The plain linear bearing that allows the head block fastening unit 1241, 1242, and the provided anchor point 1243, 1244, to move relatively to the corresponding displacement unit 1245, 1246 along the first axis 302. In the present disclosure, each head block fastening unit 1241, 1242 moves relatively to the corresponding displacement unit 1245, 1246 along an axis being parallel to the first reference axis X.

The interconnection unit 124 further comprises the one or more corresponding displacement units or Y-saddle member 1245, 1246, each displacement unit 1245, 1246 is movably coupled to the corresponding head block fastening unit 1241, 1242 and movably coupled to a spreader fastening unit 1247. Each corresponding displacement unit 1245, 1246 is arranged or configured to displace the provided anchor point 1243, 1244 of the corresponding head block fastening unit 1241, 1242 along a second axis 301 parallel to the second reference axis Y.

Each displacement unit 1245, 1246 may e.g. be movably coupled to the spreader fastening unit 1247 using a plain linear bearing or slide, such as boxway or dovetail plain linear bearings. Each displacement unit 1245, 1246 is provided with one part of the plain linear bearing and the spreader fastening unit 1247 is provided with a second part of the plain linear bearing interacting with the first part. The plain linear bearing allows the displacement unit 1245, 1246, the corresponding head block fastening unit 1241, 1242, and the provided anchor point 1243, 1244, to move relatively to the spreader fastening unit 1247 along the second axis 301. In the present disclosure, each displacement unit 1245, 1246 moves relatively to the spreader fastening unit 1247 along an axis being parallel to the second reference axis Y.

The interconnection unit 124 further comprises the spreader fastening unit 1247 configured to be attached to the spreader module 123, e.g. by using bolts or by welding the spreader fastening unit 1247 to the spreader module 123. The spreader fastening unit 1247 is arranged with a centerline extending in a second plane and parallel to the second reference axis Y. E.g. the spreader fastening unit 1247 may arranged with a rectangular box shape having the centerline. The second plane is arranged parallel to the first plane. As mentioned above, the spreader fastening unit 1247 is movably coupled to the one or more displacement units 1245, 1246.

In other words, as the various members or parts of the interconnection unit 124 move, the provided anchor points 1243, 1244, move along the first plane. The head block fastening units 1241, 1242 then typically move along a second axis 301 parallel to the second reference axis, thus adapting the positions of the anchor points 1243, 1244 to corresponding positions of anchor points of the lifting arrangement, e.g. anchor points of the head block module 122. The displacement units 1245, 1246 moves relatively to the spreader fastening unit 1247 along an axis being parallel to the second reference axis Y, thus adapting the positions of the anchor points 1243, 1244 to corresponding positions of anchor points of the lifting arrangement, e.g. anchor points of the head block module 122.

The interconnection unit 124 further comprises a plurality of locking arrangements configured to prevent each displacement unit 1245, 1246 from moving relatively to the spreader fastening unit (1247), and to prevent each head block fastening unit 1241, 1242 from moving relatively to the corresponding displacement unit 1245, 1246.

In one embodiment, each of the head block fastening units 1241, 1242, is configured to displace the provided anchor point 1243, 1244 in a first direction, along an axis, parallel to the first reference axis X by moving relatively to the corresponding displacement unit 1245, 1246.

In one embodiment, the one or more displacement units 1245, 1246 are arranged between the first and the second plane. Each displacement unit 1245, 1246 is configured to displace the anchor point 1243, 1244 of the corresponding head block fastening unit 1241, 1242 in a second direction, e.g. along the second axis 301, parallel to the second reference axis Y by moving relatively to the spreader fastening unit 1247.

In one embodiment, each displacement unit 1245, 1246 may be coupled to the spreader fastening unit 1247 using a plain linear bearing or slide, such as boxway or dovetail linear bearings. As mentioned above, each displacement unit 1245, 1246 may further be coupled to the head block fastening units 1241, 1242, using a plain linear bearing or slide. The displacement unit 1245, 1246 is provided with one part of the plain linear bearing and the head block fastening unit 1247 is provided with a corresponding second part of the plain linear bearing. The displacement unit is coupled to the spreader fastening unit 1247 using the plain linear bearing such that the displacement unit 1245, 1246, the corresponding head block fastening unit 1241, 1242, and the provided anchor point 1243, 1244, move relatively to the spreader fastening unit 1247 along an axis or in a second direction, e.g. along the second axis 301. In the present disclosure, the displacement unit/s 1245, 1246 move relatively to the spreader fastening unit 1247 along an axis parallel to the second reference axis Y, thus causing also the provided anchor point 1243, 1244 to move along the axis parallel to the second reference axis Y.

Additionally or alternatively, each of the head block fastening units 1241, 1242, may be configured to displace the corresponding anchor point 1243, 1244 in a first direction parallel to the first reference axis X, along the first plane, by moving relatively to a corresponding displacement unit 1245, 1246. In one example, a first head block fastening unit 1241 has a corresponding first displacement unit 1245, and moves relatively along an axis parallel to the first reference axis X. The first direction is typically one of two opposite directions indicated on the first axis 302 shown in FIG. 3.

The one or more displacement units 1245, 1246 are arranged, substantially or to the greatest extent of their volume, between the first and the second plane, or at least the main part of the one or more displacement units 1245, 1246 are arranged between the first and the second plane, as can be seen in FIG. 3.

Additionally or alternatively, each of the displacement unit 1245, 1246 may be configured to displace the corresponding head block fastening units 1241, 1242 and provided anchor point 1243, 1244 in a first direction along an axis, e.g. along the second axis 301, parallel to the second reference axis Y, and along the first plane, by moving relatively to the spreader fastening unit 1247. In one example, a first displacement unit 1245 has a corresponding first head block fastening unit 1241 with a provided anchor point 1243, and moves relatively along a second axis 301 parallel to the second reference axis Y. The second direction is typically one of two opposite directions indicated on the second axis 301 shown in FIG. 3. In other words, each displacement unit 1245, 1246 is configured to displace the comprised or attached anchor point 1243, 1244 of the corresponding head block fastening unit 1241, 1242 in the second direction parallel to the second reference axis Y by moving relatively to the spreader fastening unit 1247.

Figure 5:
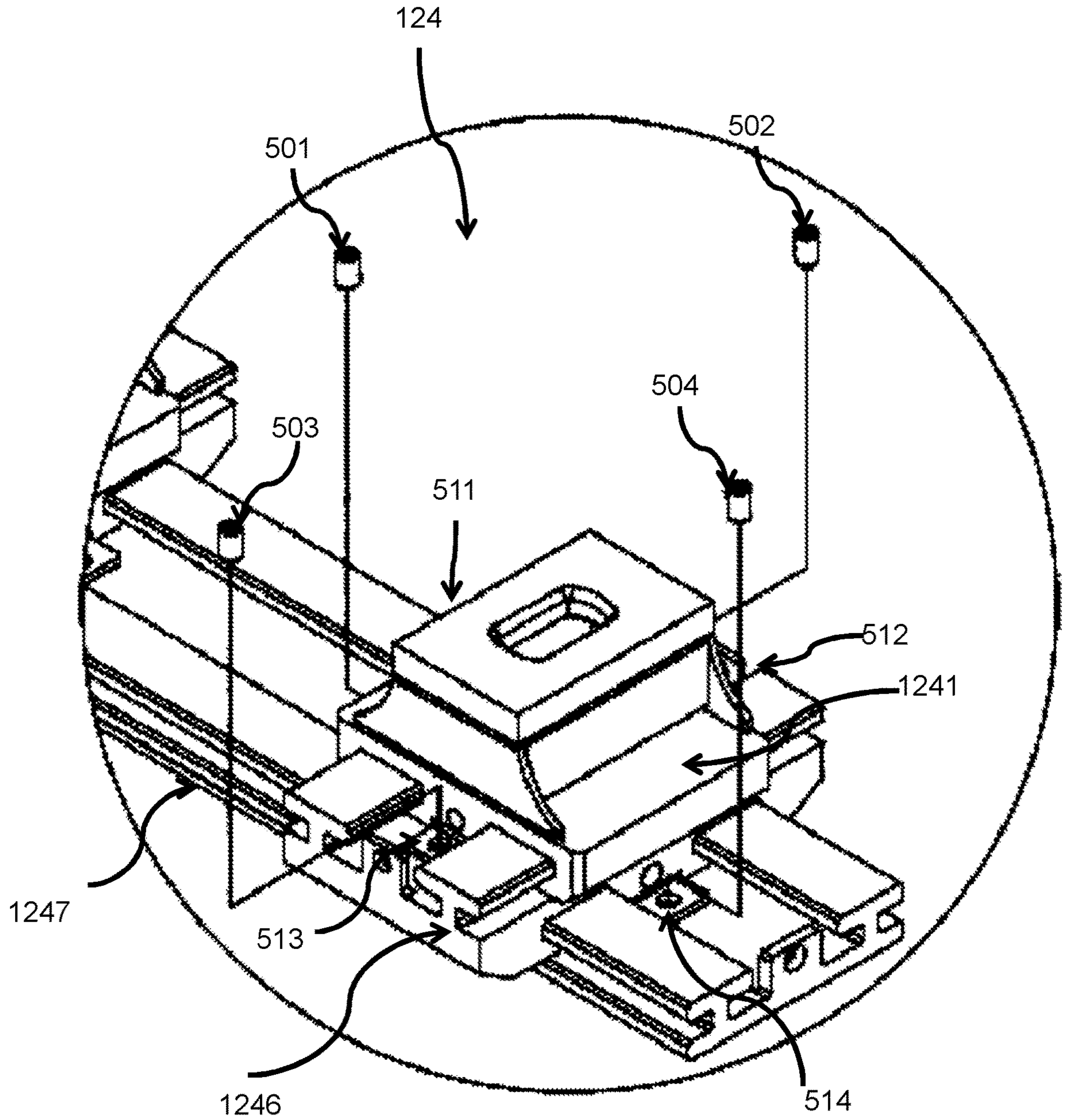
FIG. 5 shows manually operated locking arrangements according to one or more embodiments of the present disclosure.

FIG. 5 shows manually operated locking arrangements according to one or more embodiments of the present disclosure. In this embodiment, the locking arrangement/s may be at least partially manually operated, controlled, or adjusted. In other words, each head block fastening unit 1241, 1242 is typically moved along an axis parallel to the first reference axis X and/or the corresponding displacement unit 1245, 1246 is moved along an axis parallel to the second reference axis Y until a position of the provided anchor point reaches a target position, typically matching the position of an anchor point of the head block 122 module. This would typically be a position where two holes of locking members lines up to allow a locking pin to be inserted. In this embodiment, each locking arrangement of the one or more locking arrangements comprises at least:

a first locking member 511, 514 of a displacement unit 1245, 1246 having a through hole and arranged to align with one of a plurality of holes of the spreader fastening unit 1247 when moved relatively to the spreader fastening unit 1247.

The locking arrangement further comprises a second locking member 512, 513 of a corresponding head block fastening unit 1241, 1242 having a through hole and arranged to align with one of a plurality of holes of the displacement unit 1245, 1246 when moved relatively to the displacement unit 1245, 1246.

Additionally, the locking arrangement further comprises a first lock down pin 501, 504 arranged to protrude through the first locking member 511, 514 and extend into the one of a plurality of holes of the spreader fastening unit 1247, and a second lock down pin 502, 503 arranged to protrude through the second locking member 512, 513 and extend into the one of a plurality of holes of the displacement unit (1241, 1242). Examples of lock down pins may be lock down threaded pins, clamped bolts, locating pins and adjusted bolts.

Figure 6:
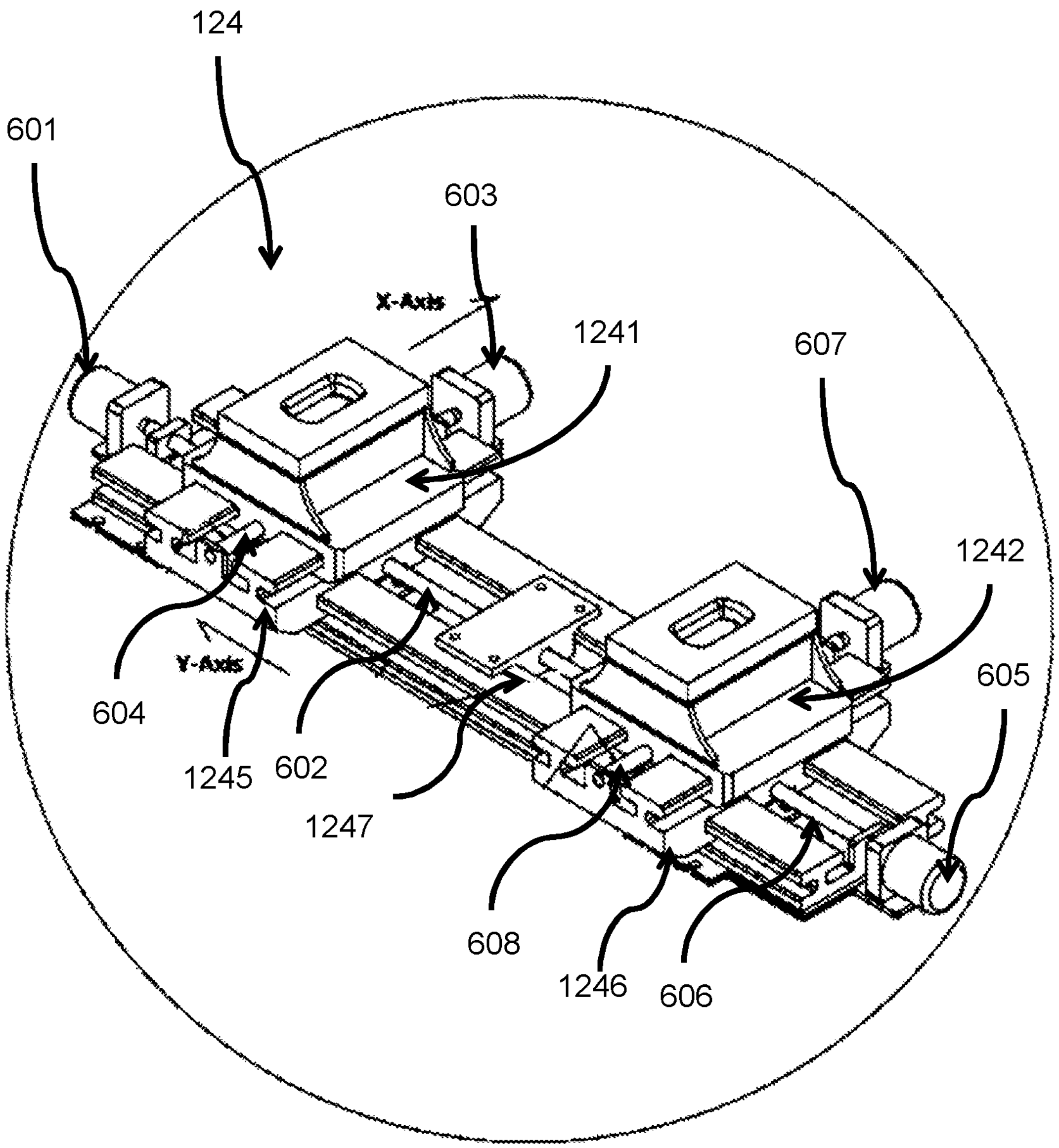
FIG. 6 shows actuated locking arrangements according to one or more embodiments of the present disclosure.

In FIG. 5, two locking members 511, 514 are provided for each displacement unit and two locking members 512, 513 are provided for each head block fastening unit. It is understood that some embodiments may use a single one locking member or three or more locking members without deviating from the present disclosure FIG. 6 shows actuated locking arrangements according to one or more embodiments of the present disclosure. The actuated locking arrangements typically comprises actuators and coupled linkage members, e.g. electric actuators and threaded rods, that are configured to move each head block fastening unit 1241, 1242 along an axis parallel to the first reference axis X and/or the corresponding displacement unit 1245, 1246 along an axis parallel to the second reference axis Y based on control signals, until a position of the provided anchor point reaches a target position, typically matching the position of an anchor point of the head block 122 module. The control signals directing the actuators to the target position may e.g. be obtained from control panels or buttons operated by a user. The control signals directing the actuators to the target position may e.g. be obtained from a control unit 710. The control signals directing the actuators to the target position may e.g. be obtained from a server or cloud 730. The actuators are typically provided with a locking mechanism, that locks or stops movement of the actuator when no control signal indicative of movement is received.

In this embodiment, each locking arrangement of the one or more locking arrangements comprises at least:

an actuator unit, wherein each actuator unit comprises an actuator (601, 603, 605, 607), e.g. an electric actuator and/or servo motor and/or a planetary drive, and a linkage member (603, 604, 606, 608), e.g. a threaded rod, a roller pinion & rack, a lead screw or rigid chain and matching cog wheels. Optionally, hydraulic, or pneumatic actuators may be used.

Alternatively or additionally, the one or more actuator units each comprises a first axis actuator, wherein the linkage member 604, 608 of the first axis actuator is coupled to a first actuator 603, 607, a displacement unit 1245, 1246 and a corresponding head block fastening unit 1241, 1242, wherein the first actuator 603, 607 is configured to displace the head block fastening unit 1241, 1242 relatively to the displacement unit 1245, 1246 in the first direction in response to a control signal. The one or more actuator units each optionally further comprises a second axis actuator, wherein the linkage member 602, 606 of the second axis actuator is coupled to a second actuator 601, 605, a displacement unit 1245, 1246 and the spreader fastening unit 1247, wherein the second actuator 601, 605 is configured to displace the displacement unit 1245, 1246 relatively to the spreader fastening unit 1247 in the second direction in response to a control signal.

Figure 7:
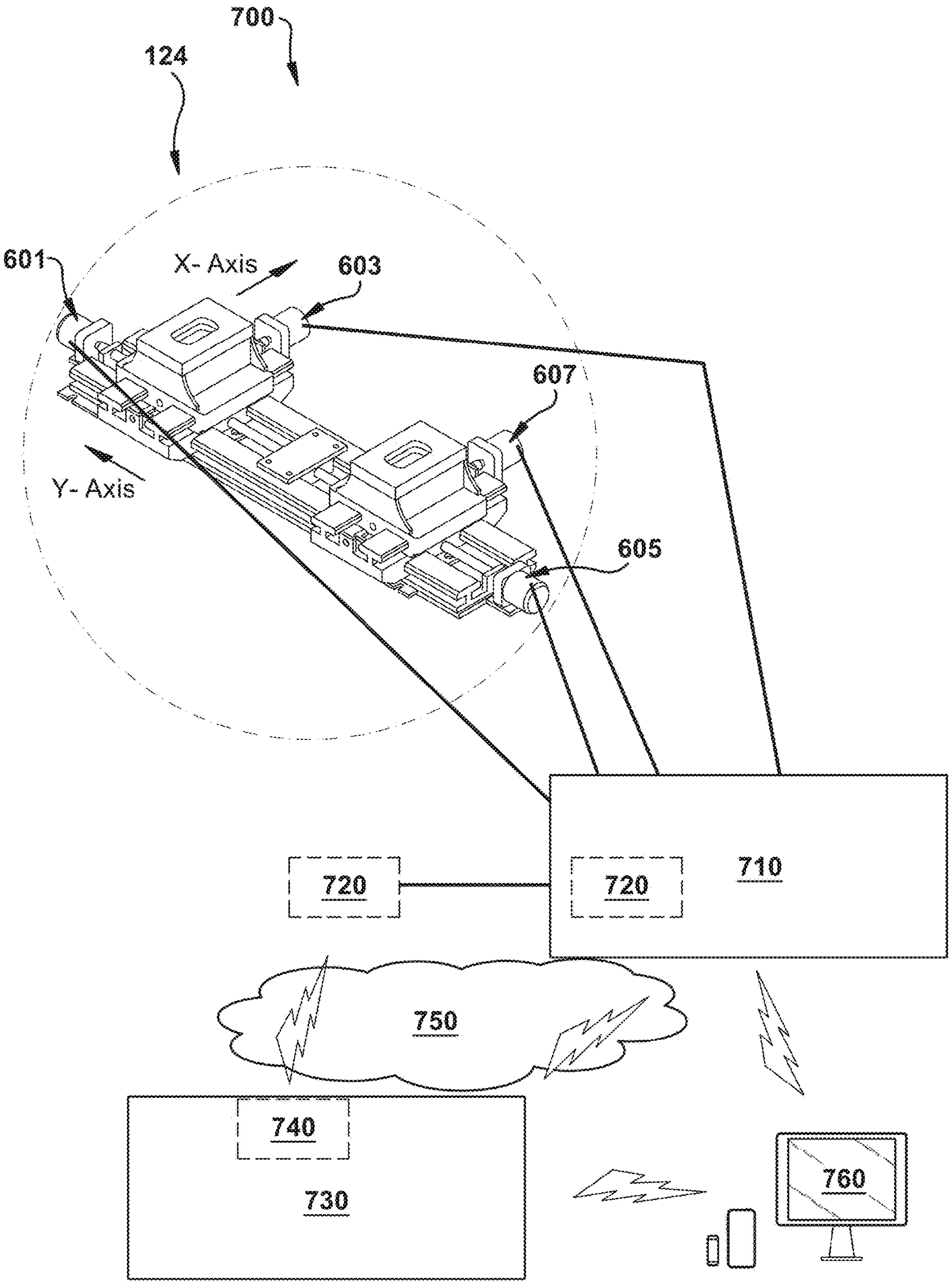
FIG. 7 shows a system for providing micro motion between modules of a cargo container coupling arrangement according to one or more embodiments of the present disclosure.

FIG. 7 shows a system 700 for providing micro motion between modules of a cargo container coupling arrangement 120, wherein the coupling arrangement is configured to be releasebly attached to a lifting arrangement 110 and configured to couple a cargo container 130 with the lifting arrangement.

The system comprises a coupling arrangement 120 comprising a plurality of modules, wherein the modules comprise at least a head block 122 module, a spreader 123 module and one or more interconnection units 124 according to any of the embodiments described herein.

The system further comprises, a control unit 710 communicatively coupled to actuators 601, 603, 605, 607 of the one or more interconnection units 124, wherein the control unit is configured to transmit control signals to the actuators 601, 603, 605, 607 of the one or more interconnection units 124, causing the one or more interconnection units to displace the head block 122 module relatively to the spreader module 123 in response to the control signals and provide micro motion between the modules of the cargo container coupling arrangement 120.

In one embodiment, positions of the anchor points of the interconnection unit are moved or adjusted to generate micro motion between the modules of the cargo container coupling arrangement 120 based on user input.

Additionally, or alternatively, the control unit 710 further comprises a communications interface 720 configured to transmit and/or receive data, e.g. to/from the actuators 601-607 of the interconnection unit 124. The communications interface 720 may be optionally be internally or externally arranged to the control unit 710.

Additionally or alternatively, the control unit 710 further comprises a user interface, the user interface comprising user input device 717 and a display 718, wherein the control unit is configured to receive an indication from a user indicative of micro motion, such as skew, list and trim movements, and send control signals indicative of displacement of actuator units corresponding to the micro motion.

In one example, a user indicates a desired skew movement of the spreader module 123 on a user interface of the control unit 710, the control unit 710 then sends control signals corresponding to an adjustment of the positions of anchor points of the interconnection unit 124 resulting in the desired skew movement of the spreader module 123.

Additionally or alternatively, the system further comprises a server 730, wherein the control unit 710 is configured to receive an indication from the server 730 indicative of micro motion, such as skew, list and trim movements, and send control signals indicative of displacement of actuators 601, 603, 605, 607 corresponding to the micro motion.

Additionally or alternatively, the system further comprises a client 760, wherein the control unit 710 is configured to receive an indication from the client 760 indicative of micro motion, such as skew, list and trim movements, and send control signals indicative of displacement of actuators 601, 603, 605, 607 corresponding to the micro motion.

In one example, a server, e.g. tasked for performing automatic container loading of a ship, indicates a desired skew movement of the spreader module 123 and sends the indication as a control signal to the control unit 710. The control unit 710 then sends control signals indicative of displacement of actuators corresponding to an adjustment of the positions of anchor points of the interconnection unit 124. The adjustment of the positions of anchor points resulting in the desired skew movement of the spreader module 123.

Additionally or alternatively, the server 730 is configured to receive control signals comprising sensor data from the sensors of the cargo container coupling arrangement 120 (not shown), and to generate the indication from the server 330 indicative of micro motion based on the sensor data and using a trained model.

The coupling arrangement 120 may comprise sensors (not shown) monitoring the coupling arrangement, e.g. monitoring the operative health status of the coupling arrangement. Example of such sensors may be twist-lock position sensors configured to detect if the twist-lock is in an open or locked position, seeker/flipper position sensors configured to detect the position of the seeker/flipper, telescoping position sensors configured to determine to which extent the adjustable length/width beams of the is extended or at which telescopic position they are in, load sensors configured to detect load, e.g. load coupled to the coupling arrangement 120 or load carried by wire ropes, vibration sensors configured to detect load and/or vibrations, e.g. vibration in wire rope sheave modules 121.

Additionally, or alternatively, the control unit is further configured to perform any method steps of the methods described herein. In other words, the control unit 710 may e.g. be arranged with the coupling arrangement 120 and/or with the lifting arrangement 110 and configured to receive control signals from the sensors. The control unit 710 is further configured to transmit control signals to actuators of the coupling arrangement 120 and/or interconnection unit 124 to control functionality of the coupling arrangement 120 or interconnection unit 124, e.g. moving position of anchor points, activating/deactivating twist-locks, positioning seekers/flippers or adjusting the telescoping beams to containers of different sizes.

The system 700 further optionally comprises a communications network 750, configured to exchange signals or control signals between sensors or nodes 710, 730, e.g. exchange control signals between a server 730 and the control unit 710.

The system 300 further optionally comprises a server 730 communicatively coupled to the control unit 710 directly or via the communications interface 720, and optionally comprising a communications interface 740 configured to transmit and/or receive data, e.g. to/from the control unit 710.

The server 730 may further be configured to perform any method steps of the methods described herein. In other words, the server 730 may e.g. be configured to transmit/receive control signals to from the sensors and/or to/from the control unit 710.

The system 700 further optionally comprises a client 760 communicatively coupled to the server 730 and/or the control unit 710 directly or via the communications network 750, and optionally comprising a communications interface (Not shown) configured to transmit and/or receive data, e.g. to/from the server 730.

In one example, the control unit 710 is configured to generate the indication micro motion based on the sensor data. In one further example, the server 730 is configured to generate the indication micro motion based on the sensor data. In one example, the client 760 is configured to generate the indication micro motion based on the sensor data.

Figure 8:
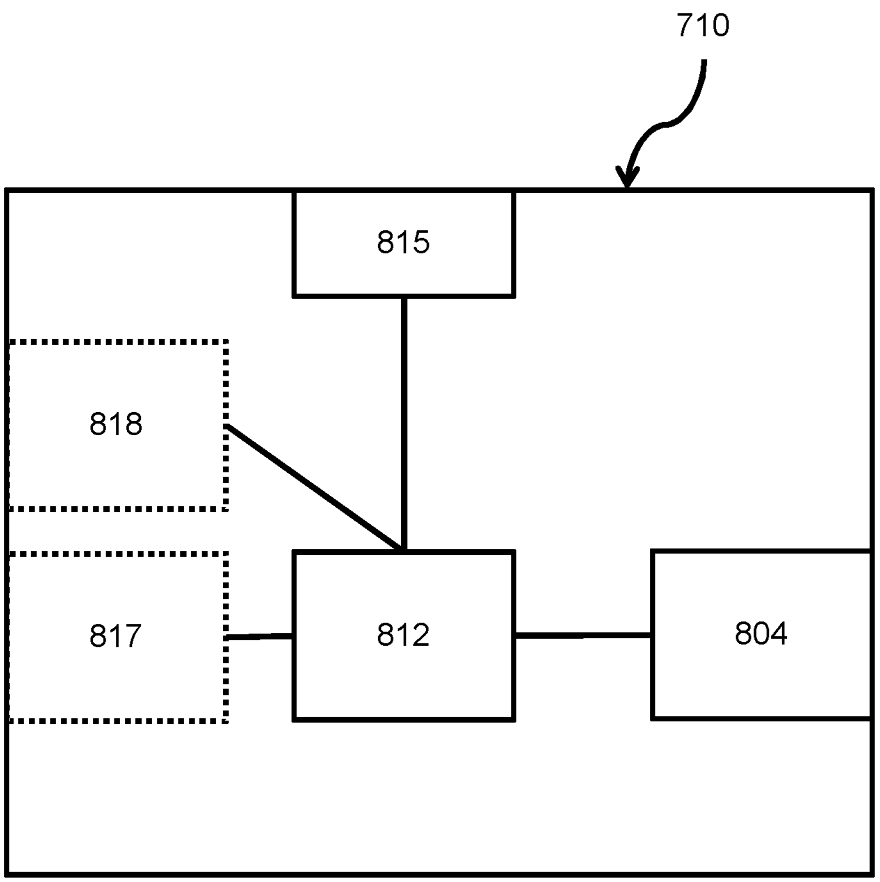
FIG. 8 shows details of a control unit according to one or more embodiments of the present disclosure.

FIG. 8 shows details of a control unit 710 according to one or more embodiments of the present disclosure.

The control unit 710 may be in the form of any one of one or more interacting servers, one or more virtual servers or cloud servers, an on-board computer, an electronic control unit (ECU), a digital information display, a stationary computing device, a laptop computer, a tablet computer, a handheld computer, a wrist-worn computer, a smart watch, a PDA, a Smartphone, a smart TV, a telephone or a media player.

The control unit 710 may comprise processing circuitry 812 optionally communicatively coupled to a transceiver for wired and/or wireless communication. Further, the control unit 710 may further comprise at least one optional antenna (not shown in figure). The antenna may be coupled to the transceiver and is configured to transmit and/or emit and/or receive wireless signals in a wireless communication system, e.g. send/receive control signals between the server 730, the control unit 710 and/or the sensors. In one example, the processing circuitry 812 may be any of a selection of processor and/or a central processing unit and/or processor modules and/or multiple processors configured to cooperate with each-other.

Further, the control unit 710 may further comprise a memory 815. The memory 815 may contain instructions executable by the processing circuitry to perform any of the methods and/or method steps described herein.

The control unit 710 may further comprise a communications interface 804/720, e.g. the wireless transceiver and/or a wired/wireless communications network adapter, which is configured to send and/or receive data values or parameters as a signal or control signal to or from the processing circuitry 812 to or from other internal or external nodes, e.g.

receive a control signal indicative of a position of a seeker/flipper, a control signal indicative of a position of a twist-lock or transmit a control signal to adjust telescopic beams to the size of a particular container.

The server 730 further optionally communicates via the communications network 750, configured to exchange signals or control signals between sensors or nodes 710, 730 nodes, e.g. exchange control signals between the server 730 and the control unit 710.

Additionally or alternatively, the communications network 750 communicate using wired or wireless communication techniques that may include at least one of a Local Area Network (LAN), Metropolitan Area Network (MAN), CAN bus, CANopen, Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Micro-wave Access (Wi-MAX) and ultrasonic communication, etc., but is not limited thereto.

In an embodiment, the communications interface 804 communicates directly between communication network nodes 710, 730, 760 or via the communications network 750.

In one or more embodiments the control unit 710 may further comprise an input device 817, configured to receive input or indications from a user and send a user-input signal indicative of the user input or indications to the processing circuitry 812.

In one or more embodiments the control unit 710 may further comprise a display 818 configured to receive a display signal indicative of rendered objects, such as text or graphical user input objects, from the processing circuitry 812 and to display the received signal as objects, such as text or graphical user input objects.

In one embodiment the display 818 is integrated with the user input device 817 and is configured to receive a display signal indicative of rendered objects, such as text or graphical user input objects, from the processing circuitry 812 and to display the received signal as objects, such as text or graphical user input objects, and/or configured to receive input or indications from a user and send a user-input signal indicative of the user input or indications to the processing circuitry 812. In embodiments, the processing circuitry 812 is communicatively coupled to the memory 815 and/or the communications interface 804 and/or the input device 817 and/or the display 318. The control unit 710 may be configured to send/receive data directly to/from another node or to send/receive data via the wired and/or wireless communications network 750.

In embodiments, the communications interface and/or transceiver 804 communicates using wired and/or wireless communication techniques.

In embodiments, the one or more memory 815 may comprise a selection of memories such as a hard RAM, disk drive, a floppy disk drive, a magnetic tape drive, an optical disk drive, a CD or DVD drive (R or RW), or other removable or fixed media drive.

In a further embodiment, the control unit 710 may further comprise and/or be coupled to one or more additional sensors (not shown) configured to receive and/or obtain and/or measure physical properties pertaining to the lifting arrangement 110, coupling arrangement 120, or cargo container 130 and send one or more sensor signals indicative of the physical properties to the processing circuitry 812, e.g. ambient temperature.

The server may comprise all or a subset of features of the control unit 710 described in relation to FIG. 8.

The client 760 may comprise all or a subset of features of the control unit 710 described in relation to FIG. 8.

Figure 9:
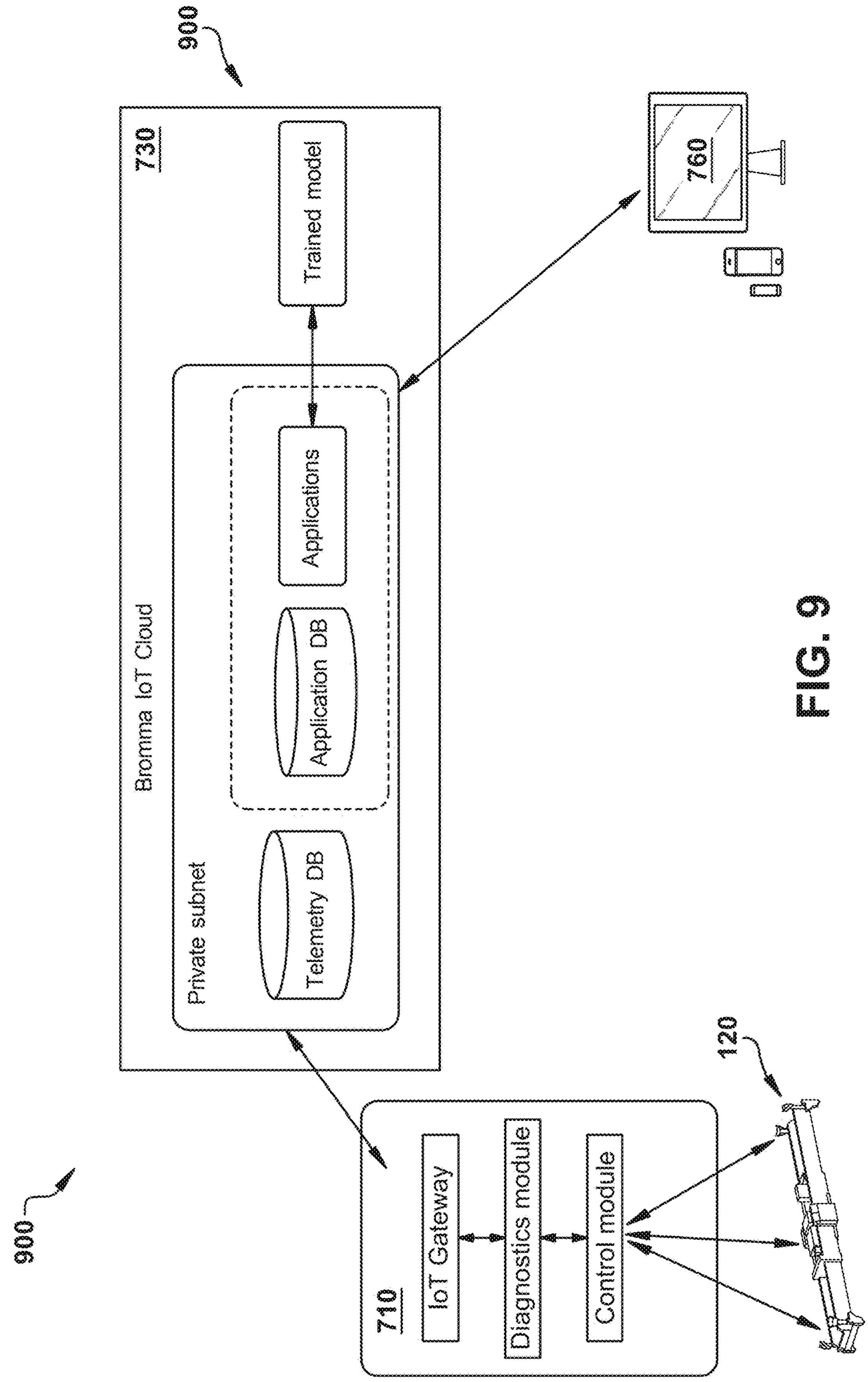
FIG. 9 shows an example of a system for providing micro motion between modules of a cargo container coupling arrangement according to one or more embodiments of the present disclosure.

FIG. 9 shows an example of a system 700 for providing micro motion between modules of a cargo container coupling arrangement 120 according to one or more embodiments of the present disclosure.

As described in relation to FIG. 2 and FIG. 7, the system 700 may comprise a coupling arrangement 120 configured to be releasebly attached to a lifting arrangement 110 and configured to couple a cargo container 130 with the lifting arrangement 110.

The system 700 comprises a control unit 710 communicatively coupled to the sensors and/or actuators of the coupling arrangement 120. In the example shown in FIG. 9, the control unit 710 may comprise a communications interface 804 comprising an IoT (Internet of Things) gateway, a diagnostic module, and a control module. The control module typically manages spreader operation based on crane commands. The diagnostics system typically gathers and interprets sensor information obtained by the control system, e.g. applies predetermined conditions on control signals obtained/received from the sensors. The IoT gateway typically communicates control signals to/from the server 730, e.g. an IoT cloud server, and may in some embodiments be integrated with the diagnostics module and host diagnostics system software. In one application, as shown in FIG. 9, the control unit, e.g. comprising the IoT gateway, the diagnostics module and the control module are onboard on or arranged with the spreader. In other applications, the IoT gateway, the diagnostics module and the control module are onboard on or arranged with the lifting arrangement, such as a crane. The IoT gateway typically communicate using private IP addresses, a secured private tunnel over internet and encrypted data transfer.

The system 700 further comprises a server 730, e.g. an IoT cloud server, communicatively coupled to the control unit 710 directly or via the communications interface 720, and comprising a communications interface 740 configured to transmit and/or receive data. The server 730 typically resides within a private subnet, which is not accessible from the Internet. The server 730 further typically use elastic load balancing and accepts data only from trusted sources. The server 730 is further typically communicatively coupled to a client 760, e.g. in the form of a desktop computer, laptop computer, tablet computer, smartwatch, or smartphone.

In one example, data collected during lifts of containers are used as training data that can be applied to train a trained model. In particular data indicative of micro motion of a spreader, such as skew, list and trim movements and corresponding sensor data.

The data may be collected during a lifting sequence. The trained model may be any suitable machine learning model, such as neural-network-based models.

In operational mode, received sensor data are then inputted to the trained model to receive indications of micro motion of the spreader module 123.

In other words, the server 730 typically collects data of a fleet of coupling arrangements 120, such as crane spreaders. The encrypted data is then transferred via an IoT gateway communicating over a secure private tunnel from the control units 710 to the server 730. The data is stored in a secure private cloud instance, where it can only be accessed by authorized personnel and applications. Any application controlling the process may be running in a secure private cloud instance. Application requests are isolated from the public Internet through load balancers and all data traffic is encrypted. Access management is implemented to ensure only authenticated users can access data.

In one example, a lifting sequence comprises:

1. receiving one or more control signals from sensors indicative of that the position of all twist-locks are in an unlocked position.
2. transmitting a control signal to actuators of the twist-locks to place the twist-locks in a locked position. E.g. after receiving a lock command from the lifting arrangement 110, e.g. a crane.
3. receiving one or more control signals from sensors indicative of that the position of all twist-locks of the coupling arrangement 120 are in a locked position.
4. receiving one or more control signals from sensors, e.g. load sensors of the coupling arrangement 120, indicative of the container 130 being lifted or hoisted.
5. receiving one or more control signals from sensors, e.g. load sensors of the coupling arrangement 120, indicative of the container 130 being landed.
6. transmitting a control signal to actuators of the twist-locks of the coupling arrangement 120 to place the twist-locks in an unlocked position. E.g. after receiving a unlock command from the lifting arrangement 110, e.g. a crane.
7. receiving one or more control signals from sensors of the coupling arrangement 120 indicative of that the position of all twist-locks are in an unlocked position.

In one embodiment, a computer program is provided and comprising computer-executable instructions for causing a control unit 710, when the computer-executable instructions are executed on a processing unit circuitry 812 comprised in the control unit 710, to perform the method steps:

receive an indication indicative of desired micro motion of a cargo container coupling arrangement 120, such as skew, list and trim movements, and send control signals indicative of displacement of actuators 601, 603, 605, 607 corresponding to the indicated micro motion.

In one embodiment, a computer program product is provided and comprises a computer-readable medium 815 with instructions which, when executed by a computer such as the server 730 or control unit 710, cause the computer to perform any selection of any method steps described herein.

Additionally, variations to the disclosed embodiments can be understood and effected by those skilled in the art in practicing the claimed invention, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope.

The computer program described herein may for example be provided in a computer program product. In other words, a computer program product may comprise a computer-readable medium with instructions which, when the instructions are executed by a computer (or by a processor comprised in the computer), cause the computer to perform the method described herein. The computer-readable medium may for example be a transitory computer-readable medium (such as a signal or wave carrying the instructions from a transmitter to a receiver) or a non-transitory computer-readable medium (such as a storage medium or memory on which the instructions are stored). Further examples of transitory computer-readable media include an electronic signal, an optical signal, and a radio signal.

It will be appreciated that a processor (or processing circuitry) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Figure 10A:
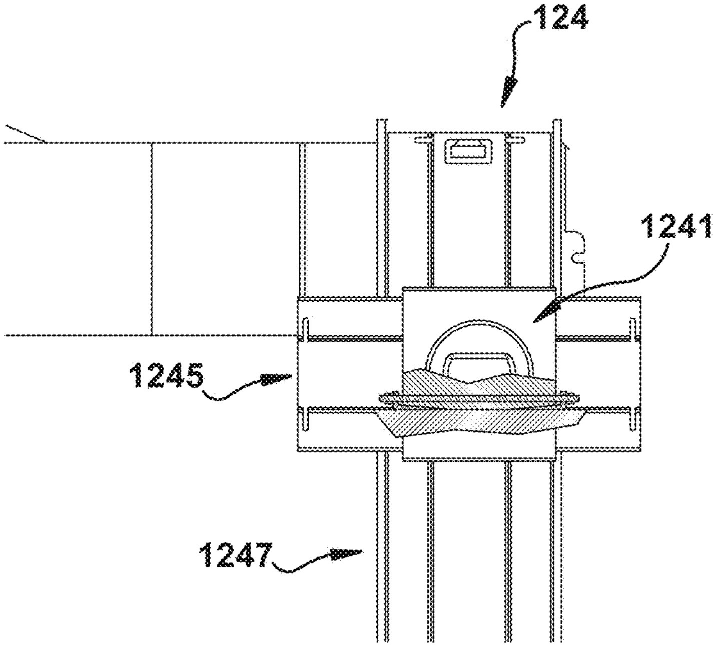
FIG. 10 shows a further manually operated locking arrangements according to one or more embodiments of the present disclosure.

FIG. 10A shows a further manually operated locking arrangements according to one or more embodiments of the present disclosure. In this embodiment, the locking arrangement/s may be at least partially manually operated, controlled, or adjusted. In other words, each head block fastening unit 1241, 1242 is typically moved along an axis parallel to the first reference axis X and/or the corresponding displacement unit 1245, 1246 is moved along an axis parallel to the second reference axis Y until a position of the provided anchor point reaches a target position, typically matching the position of an anchor point of the head block 122 module. This would typically be a position where anchor points of the spreader module 123 and head block 122 module line up with each other. A double wedge gib locking system is then deployed to securely lock the saddle 1241 and displacement unit/base 1245 in place once the relative XY alignment, coordination and positioning of anchor points of the spreader module 123 and the head block 122 module is completed. The locking principle is using taper machined gib plate 1015 provided with a treated friction surface, e.g. fine groove cut, coarse texture etc., and friction base substrate or preparation. A specified length of a high strength threaded rod 1013 is then pinned through a bored hole in the displacement unit/base 1245, each end of the rod is provided with nuts 104, 1016 threaded onto the ends of the rod 1013, and the torque of bolts/nuts 1014 are tightened (according to the chosen bolt size) on both sides of the saddle to lock the saddle in position. The bolt may be locked with the aid of with nylon lock nut and a wedge lock washer. The configuration can also be used as a pair oppositely to achieve the most effective locking performance.

In other words, XY alignment, coordination, and positioning of anchor points of the spreader module 123 relatively to the head block 122 module can be made continuous contrary to the discrete position adjustment for the design shown in FIG. 5.

Figure 10B:
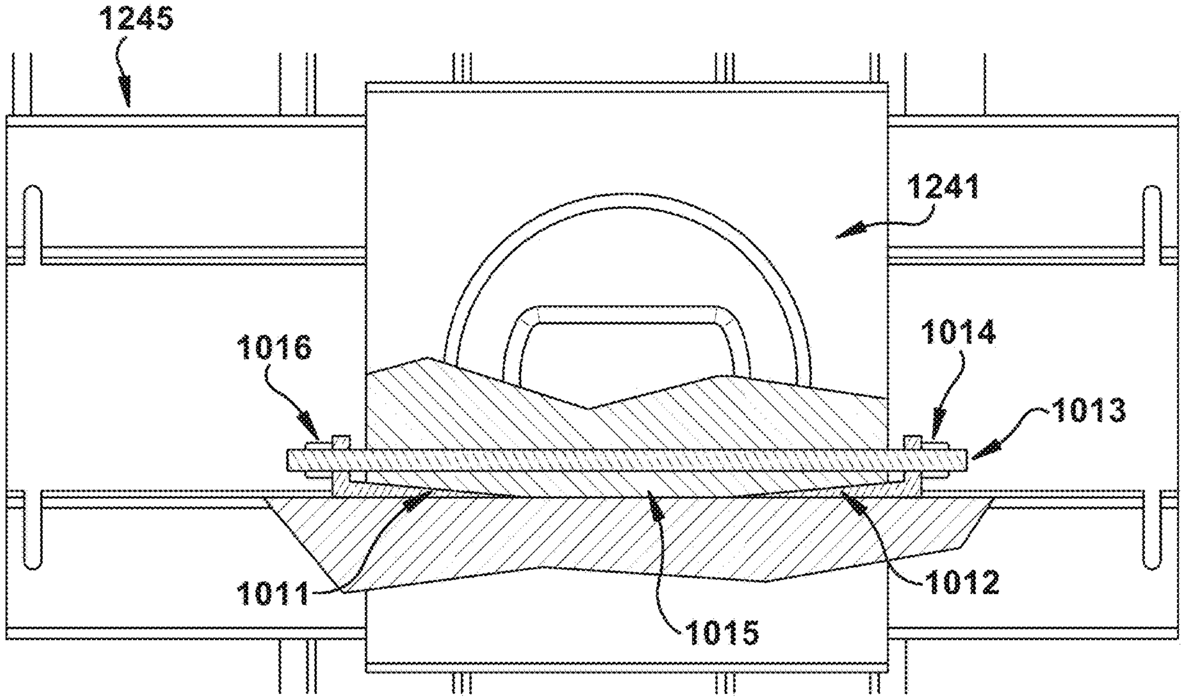

A further advantage is that aside the locking feature being achieved; it also has the advantage of facilitating the head block fastening unit 1241 and displacement unit/base 1245 assembly where larger tolerance can be deployed to achieve an increased flexibility to adapt to different headblock designs design for the assembly. In other words FIG. 10B shows details of the further manually operated locking arrangements according to one or more embodiments of the present disclosure. In this embodiment, each locking arrangement of the one or more locking arrangements comprises at least a third locking member 1012. The third locking member 1012 being provided with two flanges arranged perpendicular to each other. A first flange is provided with a through hole and the second flange is wedge shaped. The one or more locking arrangements further comprises a fourth locking member 1015 in the form of a wedge shaped gib. The gib has a wedge shape matching the wedge shape of the second flange of the third locking member 1012. The one or more locking arrangements further comprises, a fifth locking member 1013 in the form of a rod arranged to be inserted through the through hole of the first flange of the third locking member 1012 and through a through hole of the head block fastening unit 1241. The wedge shape of the second flange of the third locking member 1012 is arranged in contact with the wedge shaped gib of the fourth locking member 1015.

In one or more embodiments, the gib of the fourth locking member 1015 may be provided with a friction surface e.g. fine groove cut, coarse texture etc., or a friction based substrate or preparation.

In one or more embodiments, the rod of the fifth locking member 1013 is threaded, and the locking arrangement is further provided with a nut 1014 threaded onto the rod.

The rod 1013 may further be provided with a holding element provided at the opposite end of the rod 1013, to the end with the threaded nut 1014. Additionally or alternatively, the holding element may be a second threaded nut 1016.

In other words, the locking arrangement is activated when the rod pulls on the second flange with a through hole of the third locking member 1012. In one example, the first flange of the third locking member 1012 is then forced against the gib of the fourth locking member 1015 and the corresponding displacement unit 1245, thus creating friction based locking of the head block fastening unit 1241. In one further example, the first flange of the third locking member 1012 is then forced against the gib of the fourth locking member 1015 and the corresponding spreader fastening unit 1247, thus creating friction based locking of the displacement unit 1245.

In some embodiments, wedge shaped elements act on the gib in opposite directions, as shown in the example of FIG. 10B. In this embodiment, the locking arrangement further comprises a sixth locking member 1016. The sixth locking member 1016 is provided with two flanges arranged perpendicular to each other. One of the flanges is provided with a through hole and the other flange is wedge shaped. The wedge shape matching the wedge shape of the flange of the third locking member 1012 and the wedge shape of the gib. The rod 1013 is further arranged to be inserted through the through hole of the third flange of the sixth locking member 1012. The wedge shape of the fourth flange of the sixth locking member 1016 is arranged in contact with the wedge shaped gib of the fourth locking member 1015.

In FIG. 10A-B, two locking members 1011, 1012 are provided for each displacement unit and two locking members 1011, 1012 are provided for each head block fastening unit. It is understood that some embodiments may use a single one locking member or three or more locking members without deviating from the present disclosure.

Finally, it should be understood that the invention is not limited to the embodiments described above, but also relates to and incorporates all embodiments within the scope of the appended independent claims.

The invention claimed is:

1. Interconnection unit configured to connect modules of a cargo container coupling arrangement, the coupling arrangement being configured to be releasebly attached to a lifting arrangement and configured to couple a cargo container with the lifting arrangement, wherein the modules comprise at least a head block module and a spreader module, the interconnection unit comprising:

one or more head block fastening units, each head block fastening unit being provided with an anchor point arranged in a first plane, wherein a first reference axis and a second reference axis are mutually orthogonal to one another and extending along the first plane, wherein the anchor point is configured to releasebly attach to the head block module of the lifting arrangement using an anchor point matching the head block module, each head block fastening unit movably coupled to a corresponding displacement unit and arranged to displace the provided anchor point along an axis parallel to the first reference axis, the interconnection unit further comprising the one or more corresponding displacement units, each displacement unit being movably coupled to the corresponding head block fastening unit and movably coupled to a spreader fastening unit, the displacement unit being arranged to displace the provided anchor point of the corresponding head block fastening unit along a axis parallel to the second reference axis, the interconnection unit further comprising the spreader fastening unit configured to be attached to the spreader module, wherein the spreader fastening unit is movably coupled to the one or more displacement units, and the interconnection unit further comprising a plurality of locking arrangements, each locking arrangement being configured to prevent each displacement unit from moving relatively to the spreader fastening unit, or to prevent each head block fastening unit from moving relatively to the corresponding displacement unit.

2. The interconnection unit according to claim 1, wherein each anchor point comprises a twist-lock pin connection or a pin trough connection.

3. The interconnection unit according to claim 1, further comprising a plurality of locking arrangements configured to:

prevent each displacement unit from moving relatively to the spreader fastening unit, and to to prevent each head block fastening unit from moving relatively to the corresponding displacement unit.

4. The interconnection unit according to claim 3, wherein each locking arrangement of the one or more locking arrangements comprises at least:

a first locking member of a displacement unit having a through hole and arranged to align with one of a plurality of holes of the spreader fastening unit when moved relatively to the spreader fastening unit, and a second locking member of a corresponding head block fastening unit having a through hole and arranged to align with one of a plurality of holes of the displacement unit when moved relatively to the displacement unit, wherein the locking arrangement further comprises a first lock down pin arranged to protrude through the first locking member and extend into the one of a plurality of holes of the spreader fastening unit, and a second lock down pin arranged to protrude through the second locking member and extend into the one of a plurality of holes of the displacement unit.

5. The interconnection unit according to claim 3, wherein each locking arrangement of the one or more locking arrangements comprises at least:

an actuator unit, wherein each actuator unit comprises an actuator and a linkage member.

6. The interconnection unit according to claim 5, wherein the one or more actuator units each comprises a first axis actuator, wherein the linkage member of the first axis actuator is coupled to a first actuator, a displacement unit and a corresponding head block fastening unit, wherein the first actuator is configured to displace the head block fastening unit relatively to the displacement unit in a first direction in response to a control signal.

7. The interconnection unit according to claim 5, wherein the one or more actuator units each comprises a second axis actuator, wherein the linkage member of the second axis actuator is coupled to a second actuator, a displacement unit and the spreader fastening unit, wherein the second actuator is configured to displace the displacement unit relatively to the spreader fastening unit in a second direction in response to a control signal.

8. A system for providing micro motion between modules of a cargo container coupling arrangement, wherein the coupling arrangement is configured to be releaseably attached to a lifting arrangement and configured to couple a cargo container with the lifting arrangement, the system comprising:

a coupling arrangement comprising a plurality of modules, wherein the modules comprise at least a head block module, a spreader module and one or more interconnection units according to claim 1, and, a control unit communicatively coupled to actuators of the one or more interconnection units, wherein the control unit is configured to transmit control signals to the actuators of the one or more interconnection units, causing the one or more interconnection units to displace the head block module relatively to the spreader module in response to the control signals and provide micro motion between the modules of the cargo container coupling arrangement.

9. The system according to claim 8, wherein the control unit further comprises a user interface, the user interface comprising user input device and a display, wherein the control unit is configured to receive an indication from a user indicative of micro motion, such as skew, list and trim movements, and send control signals indicative of displacement of actuator units corresponding to the micro motion.

10. The system according to claim 8, wherein the system further comprises a server, wherein the control unit is configured to receive an indication from the server indicative of micro motion, such as skew, list and trim movements, and send control signals indicative of displacement of actuators corresponding to the micro motion.

11. The system according to claim 8, wherein the server is configured to receive control signals comprising sensor data from the sensors of the cargo container coupling arrangement, and generate the indication from the server indicative of micro motion using a computer implemented trained model.

12. A control unit communicatively coupled to actuators of one or more interconnection units according to claim 1, wherein the control unit is configured to transmit control signals to the actuators of the one or more interconnection units, causing the one or more interconnection units to displace one or more anchor points of the one or more interconnection units in response to the control signals.

13. A computer program comprising computer-executable instructions for causing a control unit according to claim 12, when the computer-executable instructions are executed on a processing unit circuitry comprised in the control unit, to perform the method steps:

receiving an indication indicative of desired micro motion of a cargo container coupling arrangement, such as skew, list and trim movements, and sending control signals indicative of displacement of actuators corresponding to the indicated micro motion.

14. A spreader module comprising the interconnection unit according to claim 1.

* * * * *